R. A. BONNELL.
FISH HOOK.
APPLICATION FILED JUNE 19, 1911.
1,056,397.
Patented Mar. 18, 1913.
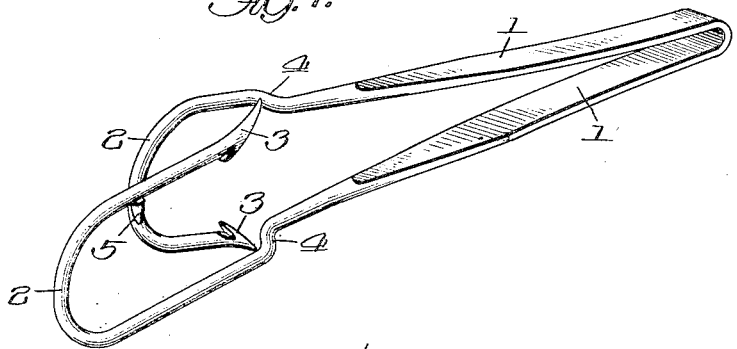
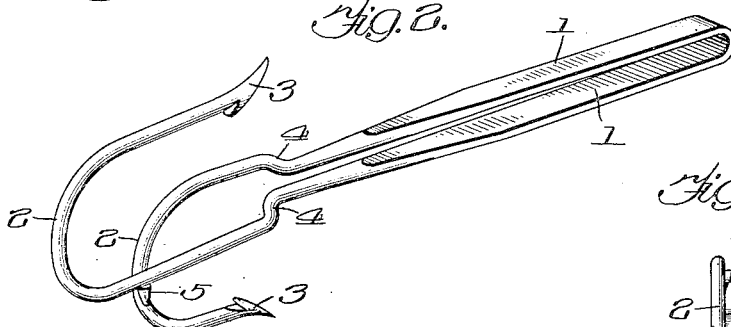
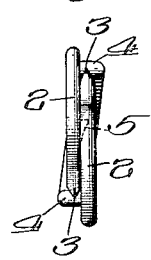
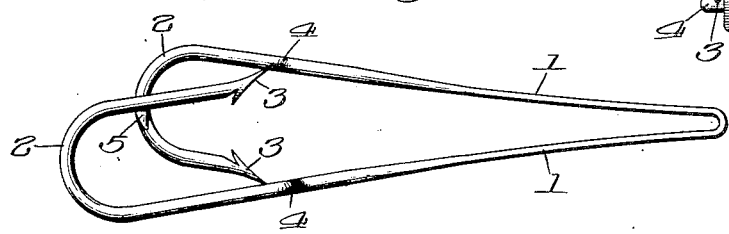
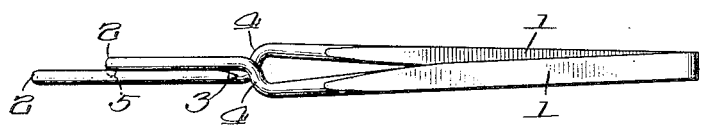
Witnesses:
Jno. H. Nelson Jr.
Edwin B. Nelson
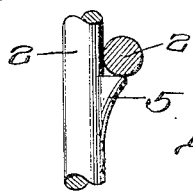
Inventor:
Ralph A. Bonnell.
By G. L. Cragg
Atty.

UNITED STATES PATENT OFFICE.

RALPH A. BONNELL, OF CHICAGO, ILLINOIS.

FISH-HOOK.

1,056,397.   Specification of Letters Patent.   Patented Mar. 18, 1913.

Application filed June 19, 1911. Serial No. 634,049.

*To all whom it may concern:*

Be it known that I, RALPH A. BONNELL, citizen of the United States, residing at Chicago, in the county of Cook and State of Illinois, have invented a certain new and useful Improvement in Fish-Hooks, of which the following is a full, clear, concise, and exact description, reference being had to the accompanying drawings, forming a part of this specification.

My invention relates to that class of fish hooks that employ duplicated hook elements which are so correlated that each is adapted to coöperate with the other to guard the entire hook structure from entanglement with weeds, moss, snags, etc., and yet which permits relative movement between the parts of the fish hook structure when the bait is taken so that the fish hook may then perform its function as such.

Fish hook structures of the class to which my invention relates hitherto were of such a nature that the barb elements thereof would be likely to assume normal relation after they had been displaced by the action of the fish in taking the bait. It was therefore possible for fish to escape even after properly displacing the barb elements of the fish hook structure.

It is an object of my invention to provide means whereby the barb elements of the fish hook structure are maintained in their relative displaced positions so that each half of the fish hook cannot resume its guarding function over the barb of the other half of the structure after the fish has properly actuated the fish hook structure so that the entry of the barbs within the mouth of the fish is practically assured.

Hitherto the fish hook structures of the class described were not provided with any guarding formation that faced the barb points, guarding formations being merely laterally disposed with respect to the barbs. I not only provide guarding formations that are laterally disposed with respect to the barbs but I also provide guarding formations that face the barb points whereby the entry of weeds or other foreign matter between the barbs and the parts laterally guarding the same is obviated.

I will explain my invention more fully by reference to the accompanying drawing showing the preferred embodiment thereof and in which—

Figure 1 is a perspective view of the hook structure in normal or idle condition; Fig. 2 is a perspective view showing the hook members displaced as by the action of the fish thereupon in taking the bait; Fig. 3 is a flat longitudinal view of the structure; Fig. 4 is an end view of the structure; Fig. 5 is a sectional view taken across one barb stem where it engages the catch upon the complemental part of the stem; and Fig. 6 is an edge longitudinal view of the structure.

Like parts are indicated by similar characters of reference throughout the different figures.

As my invention is preferably practised it includes a pair of fish hook elements each comprising a shank 1 merging with a fish hook bend 2 that in turn merges with a bard 3. The shanks 1 are suitably united and are preferably merged at the ends opposite the barbs 3, and these shanks are desirably flattened throughout the greater parts thereof that are adjacent to the junction of the shanks so that the two elements of the composite fish hook structure will be under a spring tension that will normally maintain each shank 1 in guarding relation to the barb carried by the other shank. Each shank is normally disposed laterally of the barb carried by the other, as was the case with the prior art, but each shank 1 is provided with a formation 4 that, in the embodiment of the invention illustrated, is in the form of an offset in the shank. This formation 4 provided upon each shank normally faces the point of the barb carried by the other shank. I do not limit myself to the peculiar shape of the formation 4 illustrated nor to the provision of guards 4 that are integrally formed with the shanks 1. When the fish hook structure is in normal position, the spring tension is such that the points of the barbs, as well as the sides of the barbs, are thoroughly guarded against entry within weeds, moss, snags, etc.

In order to prevent the shanks from springing back to normal position prior to the penetration of the barbs into the mouth of the fish, under the assumption that the fish so works the structure that restoration to normal would be permitted were it not for the feature of my invention about to be described. I provide a retaining device or element which is preferably in the form of a catch 5 located upon one of the hook bends and adapted to engage and hold the companion hook bend when the fish has properly displaced each barb from the normal relation it occupies with the shank carrying the other barb whereby the restoration of the barbs to normal is not permitted so that the entry of the barbs within the mouth of the fish that has taken the bait is practically assured.

The hook structure illustrated is one which is adapted for use where the bait is to be moved through the water, though the hook structure is not to be limited to this purpose. When the hook is to be adapted to bait that is to be trailed through the water the bends of the hook structure occupy unequal distances from the shank junction so that ample bait receiving space may intervene between the bends, though I do not limit myself to bait space between the bends.

While I have herein shown and particularly described the preferred embodiment of my invention, I do not wish to be limited to the precise construction shown as changes may readily be made without departing from the spirit of my invention.

Having thus described my invention, I claim as new and desire to secure by Letters Patent the following:—

1. A fish hook structure including two symmetrically related hook elements comprising barb carrying united shanks under spring tension serving when free to act relatively to position the hook elements to cause each barb to be guarded by the shank carrying the other barb, one of said hook elements being provided with a catch adapted to engage the other hook element and to hold the contiguous portions of the united shanks in mutually approached positions against the spring tension thereby to unguard the barbs.

2. A fish hook structure including two symmetrically related hook elements comprising barb carrying united shanks under spring tension serving when free to act relatively to position the hook elements to cause each barb to be guarded by the shank carrying the other barb, one of said hook elements being provided with a catch adapted to engage the other hook element and to hold the contiguous portions of the united shanks in mutually approached positions against the spring tension thereby to unguard the barbs, each of said shanks having a guard formation that faces the point of the barb carried by the other shank when the shanks are separated by spring tension.

In witness whereof, I hereunto subscribe my name this 16th day of June A. D. 1911.

RALPH A. BONNELL.

Witnesses:
G. L. CRAGG,
ETTA L. WHITE.